(No Model.) 7 Sheets—Sheet 2.

W. & F. G. ZIMMERMAN.
TREE AND PLANT SETTING MACHINE.

No. 342,490. Patented May 25, 1886.

Witnesses
Isaac D. Clark
Frank Williams

Inventor
Fred G. Zimmerman
Wm Zimmerman
per Wm Zimmerman
Attorney (No Model.) 7 Sheets—Sheet 3.
W. & F. G. ZIMMERMAN.
TREE AND PLANT SETTING MACHINE.
No. 342,490. Patented May 25, 1886.
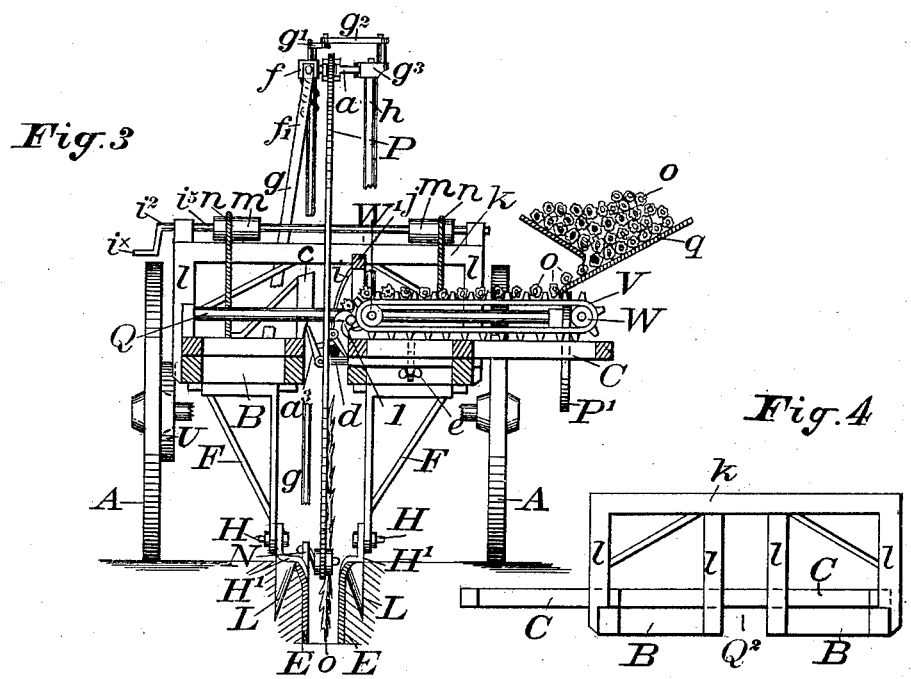
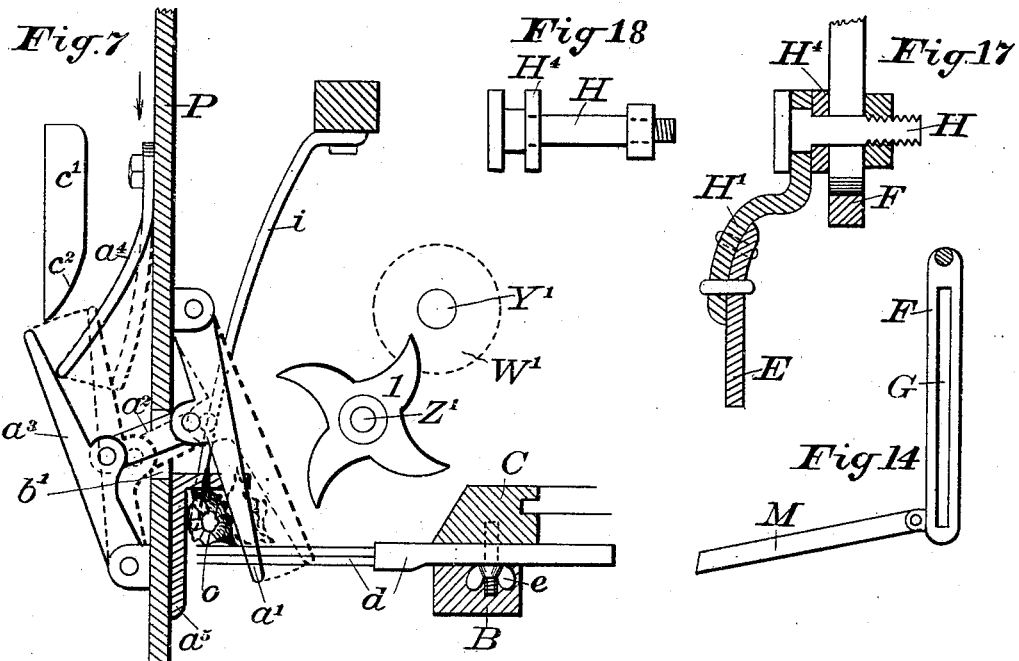
Witnesses
Isaac D. Clark
Frank Williams
Inventor
Fred G. Zimmerman
Wm. Zimmerman
per Wm. Zimmerman
Attorney (No Model.) 7 Sheets—Sheet 4.
W. & F. G. ZIMMERMAN.
TREE AND PLANT SETTING MACHINE.
No. 342,490. Patented May 25, 1886.
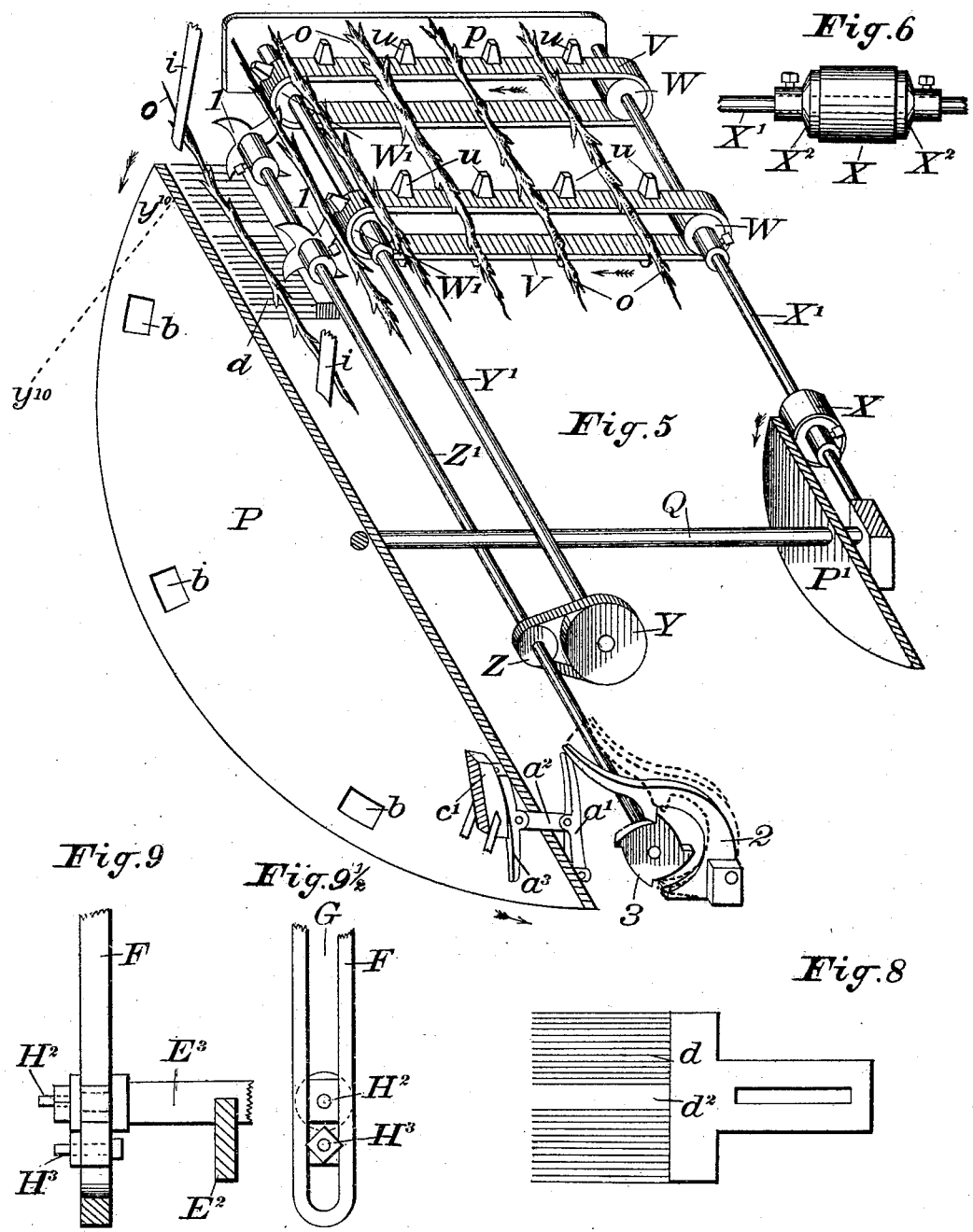
Witnesses
Isaac D. Clark
Frank Williams
Inventor
Fred G. Zimmerman
Wm Zimmerman
per Wm Zimmerman
Attorney (No Model.) 7 Sheets—Sheet 5.

W. & F. G. ZIMMERMAN.
TREE AND PLANT SETTING MACHINE.

No. 342,490. Patented May 25, 1886.

Witnesses;
Isaac D. Clark
Frank Williams

Inventor
Fred G. Zimmerman
Wm. Zimmerman
per Wm. Zimmerman
Attorney (No Model.)   7 Sheets—Sheet 6.

W. & F. G. ZIMMERMAN.
TREE AND PLANT SETTING MACHINE.

No. 342,490.   Patented May 25, 1886.

Witnesses:
Isaac D. Clark
Frank Williams

Inventor
Fred G. Zimmerman
Wm Zimmerman
per Wm Zimmerman
Attorney (No Model.) 7 Sheets—Sheet 7.
W. & F. G. ZIMMERMAN.
TREE AND PLANT SETTING MACHINE.
No. 342,490. Patented May 25, 1886.
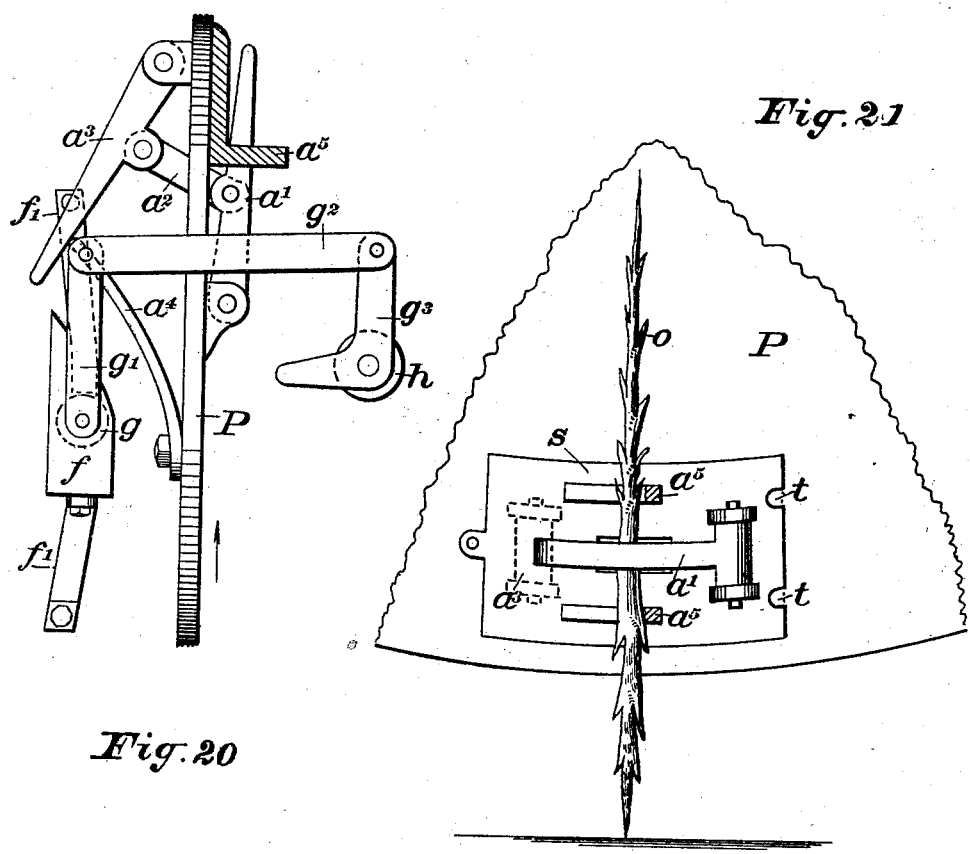
Witnesses:
Isaac D. Clark
Frank Williams
Inventor
Fred G. Zimmerman
Wm Zimmerman
per Wm Zimmerman
Attorney

UNITED STATES PATENT OFFICE.

WILLIAM ZIMMERMAN, OF CHICAGO, ILLINOIS, AND FRED G. ZIMMERMAN OF BUFFALO, NEW YORK.

TREE AND PLANT SETTING MACHINE.

SPECIFICATION forming part of Letters Patent No. 342,490, dated May 25, 1886.

Application filed June 8, 1883. Serial No. 97,499. (No model.)

*To all whom it may concern:*

Be it known that we, WILLIAM ZIMMERMAN, of Chicago, in the county of Cook and State of Illinois, and FRED G. ZIMMERMAN, of Buffalo, in the county of Erie and State of New York, have invented certain new and useful Improvements in Tree and Plant Setting and Planting Machinery; and we hereby declare the following to be a full, clear, and exact description thereof, which will enable others skilled in the art to which our invention relates to make and use the same, reference being had to the accompanying drawings, forming a part hereof, and in which—

Figure 1:
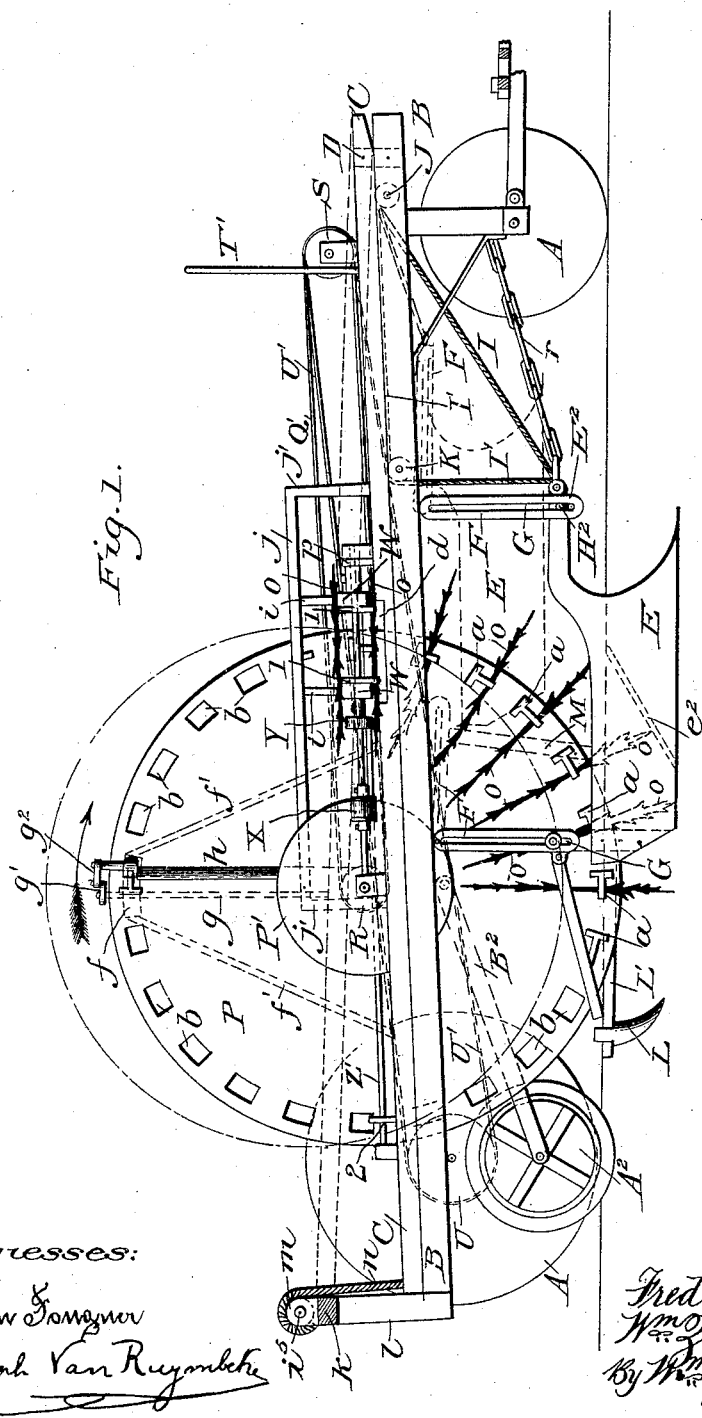
Figure 2:
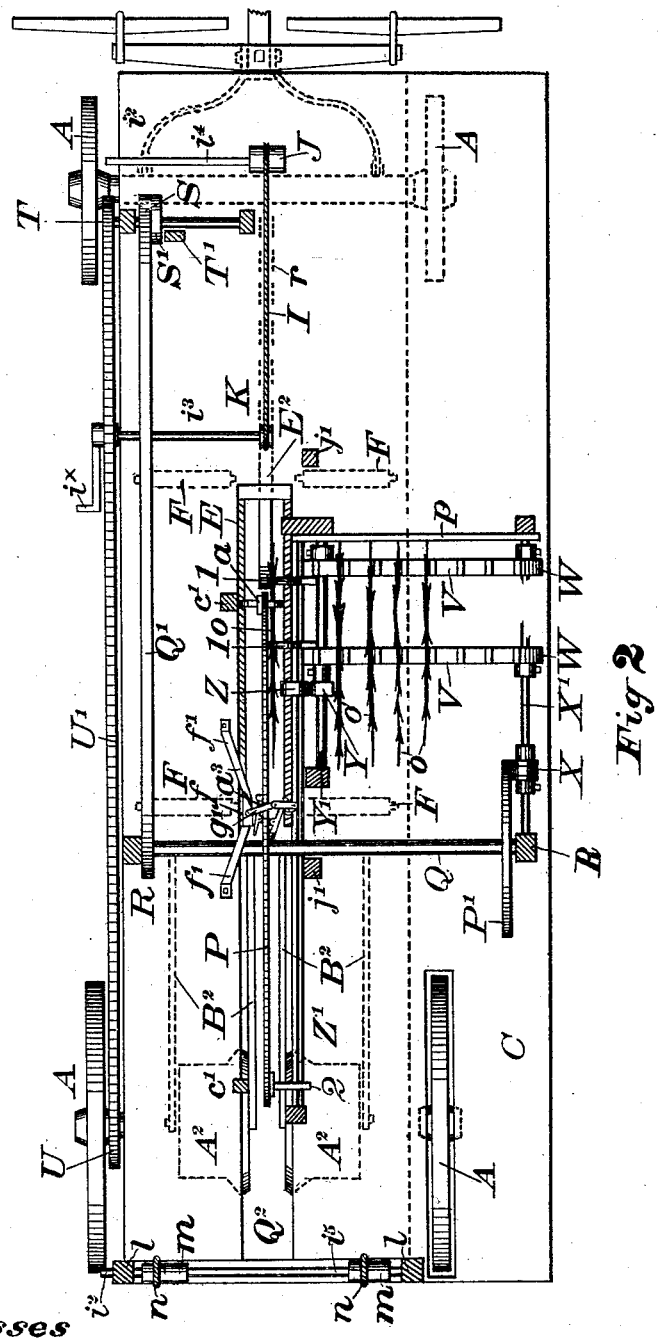
Figure 11:
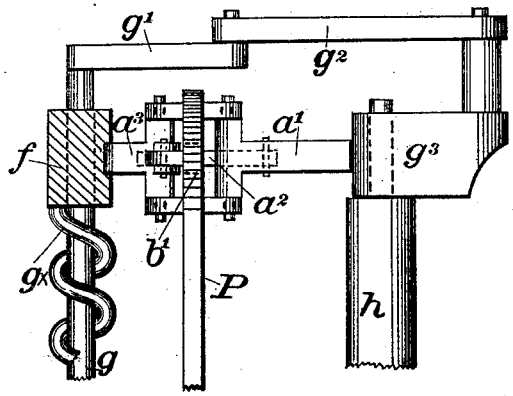
Figure 13:
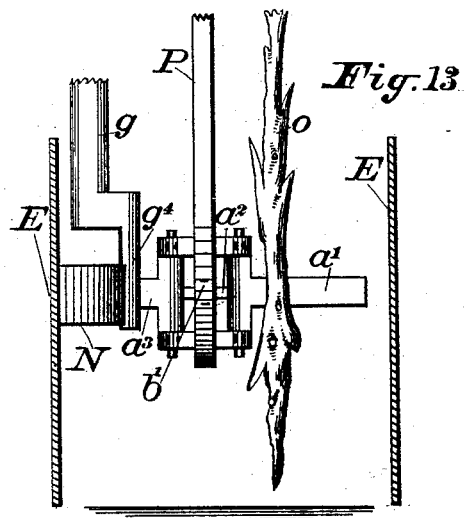
Figure 10:
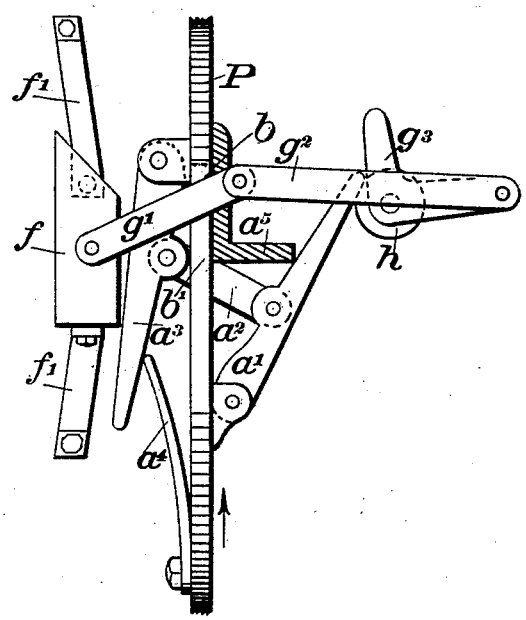
Figure 12:
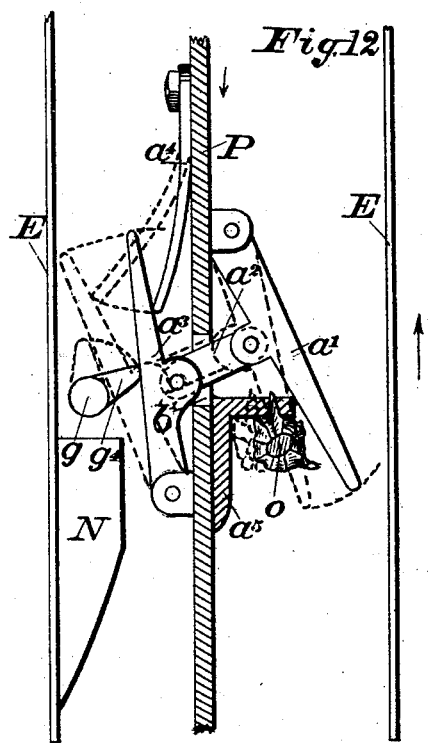
Figure 19:
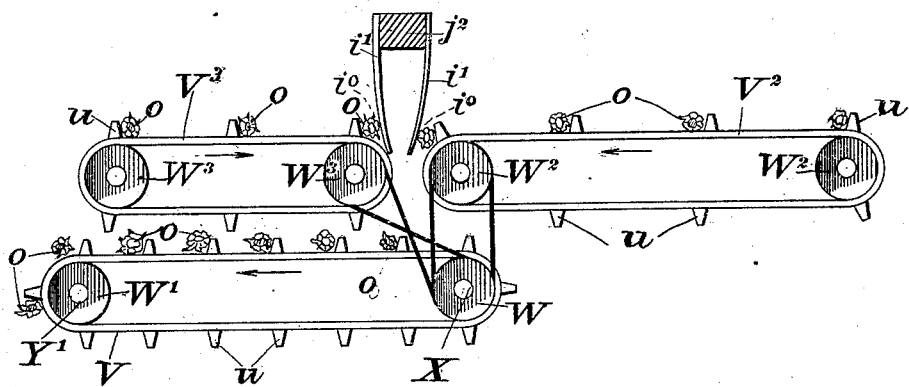
Figure 15:
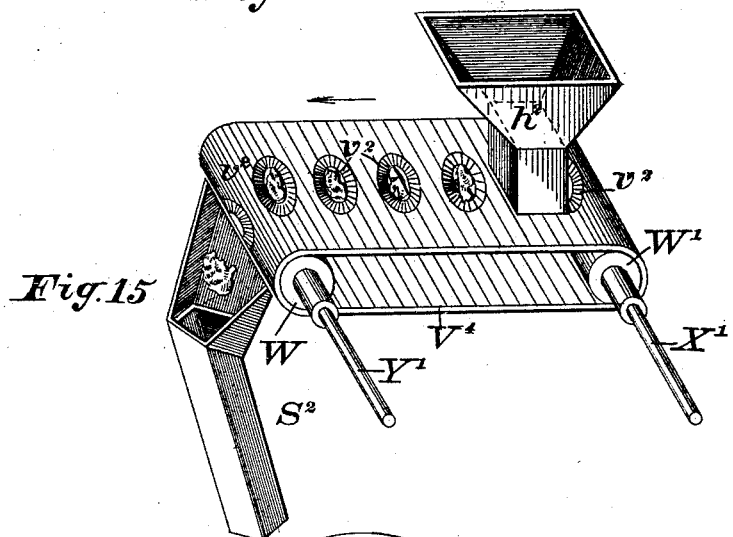
Figure 16:
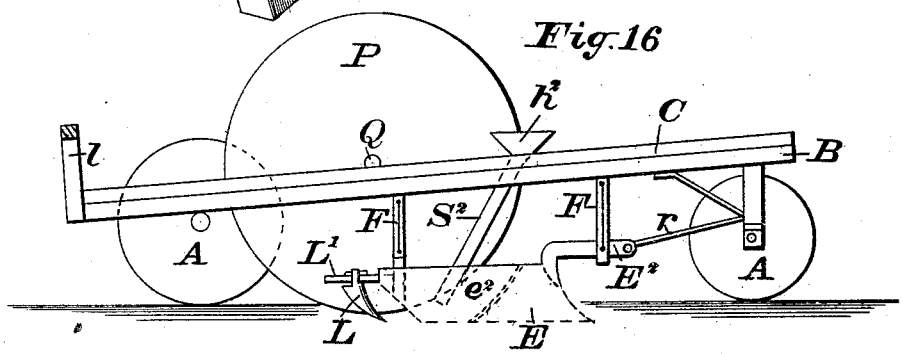

Figure 1 represents a side elevation of our improved planting-machine in operation. Fig. 2 represents a plan view, and Fig. 3 an end elevation, of the same. Fig. 4 represents a rear view of the platforms. Fig. 5 represents a perspective view of the feeding device and the mechanism immediately connected therewith. Fig. 6 is a side view of the pinion X of the friction-gear. Fig. 7 is a sectional view of the planter-wheel, taken on a vertical plane, Fig. 9½, cutting the wheel in front of the nippers in the act of grasping a plant. Fig. 8 is a plan view of the brush, which is shown in end elevation in Fig. 7. Fig. 9 shows a front and side elevation of the mechanism for holding the front end of the plow in the hangers. Fig. 10 shows a plan, and Fig. 11 an elevation, of mechanism at the extreme upper edge of the planter-wheel for the purpose of releasing the plants at the proper time in the ground and at the lowest edge of the planter-wheel, and for which the mechanism at the lowest point of the wheel is shown in Figs. 12 and 13, and of which the former represents a plan view, as seen from the center of the planter-wheel, and the latter represents a vertical elevation of the same. Fig. 14 represents a side view of the rear hanger of the plow with the hinged brace attached. Fig. 15 shows a modification of the feeding device constructed so as to be adapted to the planting of potatoes, &c. Fig. 16 is an outline side elevation of the planting-machine, showing the method of attaching the spout of the potato-planting device, also of the shovels or plows for closing the furrows. Fig. 17 is a sectional view of the bolt of the rear hanger and lug attached to the plow and a part of one side of the plow and the lower part of the hanger. Fig. 18 is the bolt shown in Fig. 17 in outline. Fig. 19 represents a modification of the feeding device shown in Figs. 1, 2, 3, and 5. Fig. 20 is a plan view of the mechanism shown at the highest point of the wheel P in Fig. 3. Fig. 21 is a side view of a fragment of the wheel P at its lowest point, with a plant held by the nippers, and said nippers attached to a plate, S, fitting into the openings $b$, to which are attached the parts $a'$ $a^3$ $a^4$, held on one end by lugs $t$ and at the other by a bolt or rivet or otherwise, so as to be removable.

Like letters of reference indicate like parts.

Our invention consists in the construction and combination of the following-described mechanism, viz: a specially-constructed plow to open a suitable furrow, operating in combination with mechanism capable of seizing plants and placing them at a proper depth, distance apart, and position into the ground, then covering their roots with earth and releasing them from the machinery and packing the soil to their roots, all as hereinafter described and shown.

In the drawings, A represents the four wheels of a vehicle, upon which is mounted a platform, B, and upon said platform is mounted a platform, C, hinged to the lower platform at D.

To the under side of the lower platform is suspended a plow, E, by means of four swinging hangers, F, provided with slots G. Through the rear hangers pass bolts H, which also pass through the lugs H', attached to the rear end of the plow, so constructed that the plow may be adjusted to work at any desired depth in the ground, and at the same time swing freely in its hangers.

To the plow-beam $E^2$ is attached a cross-bar, $E^3$, the ends of which play up and down in the slots G of the hangers F. The cross-bar $E^3$ rests upon blocks or stops $H^2$, which can be set at any point of the slot by means of screw-bolt, $H^3$, so as to hold the front end of the plow at any desired depth in the ground, and at the same time leave the blocks $H^2$ on the ends of the cross-bar $E^3$ free to slide upward.

To the plow-beam is attached a draft-chain, $r$, and at about the same point of the plow-beam is attached a rope or chain, I, of which the other end is attached to a drum, J, on shaft $i^4$.

Above the front end of the plow-beam is a pulley, K, either fixed or loose upon its shaft $i^3$, and under the hind axle of the vehicle are attached, by means of the bars $B^2$, a pair of rollers, $A^2$, provided with specially-constructed flanges, formed as shown, for the purpose of packing the soil both downward and sidewise against the roots of the plants.

To the rear end of the platform B are attached upright posts $l$, the upper ends of which are framed to a cross-bar, $k$, and thus form a truss, which rigidly unites the two sides of the rear parts of the platform divided by the slot $Q^2$, in which the planter wheel or carrier P plays. Upon said cross-bar $k$ is mounted a shaft, $i^5$, provided with drums $m$, to which are attached chains $n$, the other ends of which are secured to the platform C, and by means of this mechanism the upper platform and its attached machinery may be raised, as shown by the dotted lines in Fig. 1, by turning a crank, $i^\times$, placed upon the stud $i^2$ on end of shaft $i^5$.

To one of the hind wheels is attached a pulley, U, upon which works a drive chain or belt, U', which drives the pulley T, upon the front end of the platform C. Upon the shaft of the pulley T is also a loose pulley, S, constructed to be engaged at will with a clutch, S', operated by a lever, T', and from the pulley S works a drive-chain, Q', upon the pulley R, fixed to and driving the shaft Q, to which are attached the planter-wheel P and a friction-gear drive-wheel P'.

The wheel A and pulleys U T S R are so proportioned as to give to the wheel P the same or nearly the same revolving speed that it would have if it were rolled on the ground, its center moving forward with the same velocity as that of the vehicle. This feature forms one of the essential elements of our invention, for at or near the circumference, under the axle of the wheel, the motion of that part of the wheel in relation to the ground is zero; or, in other words, its motion toward the rear is as great as that of its axle is forward, which amounts to the same thing as if it were rolled upon the ground, for that point nearest the ground, or, as in a rolled wheel vertically under its axle, is standing still, and when it has so come in proximity to the ground, or has such motion as will be equivalent to that of a wheel rolled on the ground, all forward or backward motion ceases in relation to the ground for a perceptible time. It thus becomes obvious that when a plant is brought to the lowest point of the wheel P it is held over a fixed point in the furrow for a considerable period of time while the plow moves on and out of the way, so that the sides of the furrow may be allowed to cave in upon the root of the plant, and thus hold it before the nippers release it. The wheel P never touches the ground, but revolves freely about midway between the walls of the furrow and at various adjustable depths.

The longitudinal adjustment of the plow is made by lengthening and shortening the draft-chain $r$, which adjustment is entirely independent of the vertical adjustment made in the hangers; and when, by a considerable shortening of the chain $r$, the plow should be raised and make a shallower furrow, owing to the hangers swinging in an arc, it may be let down until the exact original depth of furrow is made. The point under the axle first begins slowly to rise, describing a course in the form of a cycloid, and thereby gives time to close up the furrow and release the nippers $a$ from the plant before it is disturbed from its position or desired place in the ground. The means of accomplishing this end may also be attained by an endless belt or apron, or by mechanism performing a reciprocating motion in the direction of the travel of the vehicle; but for obvious reasons we prefer to use a revolving wheel which may be provided with automatic nippers or claws of various constructions, of which we show the kind that we belive to be the best adapted to accomplish the desired end.

In Figs. 1, 2, and 3 the nippers are designated simply by the letter $a$.

The planter-wheel P is either a disk of wood or sheet metal or annular ring of sheet metal attached to the shaft Q and properly braced. As near to the circumference of the wheel P as may be are attached the nippers $a$, either directly to the wheel or upon separate plates fitted into holes $b$, and so secured as to be readily removed. To the face of the wheel P is attached a lever, $a'$, from which passes a link, $a^2$, through a hole, $b'$, to a lever, $a^3$, operated by a spring, $a^4$, as clearly shown in Fig. 7. Upon the face or working side of the wheel and on each side of the lever $a'$ are placed angle-pieces $a^5$, which are faced with rubber or other soft material. When the nippers are in their normal position, the spring $a^4$ throws out the lever $a^3$ and draws the lever $a'$ against the face of the wheel.

When it is desired that the nippers shall open at any point, stops or cams $c'$, $f$, and N are so placed as to cause the levers $a^3$ to be deflected against the rear side of the wheel P as they come in contact with the said cams, and thus open and hold open the lever $a'$ during any desired part of the revolution of the wheel P, depending on the length of the cam.

On the face side of the planter-wheel are mounted in suitable bearings the shafts X' and Y', which are each provided with a pair of drums, W and W', arranged to slip on said shafts, and which may be securely held at any desired point by set-screws. Said drums are connected by endless belts or chains V, provided with spurs $u$, spaced so as to freely admit plants $o$ between them.

Between the shaft Y' and the planter-wheel is a shaft, Z', provided with two four-armed spiders, 1 1, which are adjustable longitudinally on the shaft, and are fastened to it like the drums W W'. The rear end of the shaft Z' is opposite the nippers a, and is provided with a fixed four-tooth escapement-wheel, 3, working in the escapement 2, and on the same shaft is a wheel, Z, belted to a wheel, Y, from which it receives motion, in this case, in the ratio of 4 to 1. The arms of the spiders 1 work between the drums W' and reach nearly to their shaft, and are placed far enough from the planter-wheel to freely pass the plants down upon the brush d. The brush d is placed under the spiders 1 and attached to either the upper or lower platform, and so that the levers a' of the nippers will pass through its slot d². It may be set to or from the face of the planter-wheel and is held by a set-screw, e.

To enable a workman to place the greatest possible number of plants upon the carriers V, they should move as slowly as possible. The spurs u are therefore pitched as near as can well be done, say, about three-eighths of an inch for plants one-fourth of an inch in diameter and under, while for plants an inch thick the spurs would have to be proportionally farther apart, and in order to plant them as close as one-fourth-inch plants the carrier V would have to travel proportionally faster.

Plants are set at varying distances apart, the nearest being about two or three inches, and from that to four or more feet. To attain this end the nippers a are placed as near as the closest-set plants are apart, and when this distance is to be increased one or more alternate nippers are taken out of the wheel. When this is done, the speed of the carriers will have to be varied to correspond. This is attained by slipping the pinion X on its shaft to or from the shaft of the wheel P'. The proper place for each speed for the pinion may be marked on the wheel P'. The desired speed for the carriers V is thus obtained; but should, if the pinion X is not correctly set, always be slightly in excess, as the escapement 2 3 will then hold the carriers back until the proper time, the pinion meanwhile slipping between the disks X², which are set up against it just tight enough to insure motion to the carriers until arrested by said escapement. The spaces on the carriers are always to be kept full when planting.

The distance apart of plants is regulated by the number or distance apart of the nippers on the planter-wheel when it revolves at the speed before described; but it may be speeded so as to turn slightly faster or slower on its axis in proportion to the speed of the planter, when the plants will be set closer or farther apart than the nippers are pitched. The feed motion of the carriers will in all cases have to be made by the pinion X, or mechanism effecting the same result, so that a plant will be ready on the brush for each nipper as it passes.

The carriers may sometimes be dispensed with, and the plants fed to the nippers by hand when they are to be set far enough apart.

A modification of the feeding device is shown in Fig. 19, where drums W² W³, provided with carriers V² V³, are provided with spurs u, which are pitched twice the distance apart of those of the carrier V, and are driven by belts in the direction shown by the arrows, and so that all have the same speed, the spurs on V² V³ alternately passing the points i⁰. The plants o will therefore drop alternately from the carriers V² V³ and fill every space on the carrier V. By this arrangement two or more workmen can feed the machine.

The springs i', attached to a bar, j², hold the plants in passing and cause them to fall at uniform intervals.

The object of varying the distance apart between the carriers V is to accommodate them to plants of different lengths, and the gage or guide board p at the end of the roots, and against which they strike, regulates the depth of planting the uniformly-cut roots.

The springs i, attached to the bar j, prevent the plants from striking against the wheel P as they fall on the brush d, and which might otherwise by its friction throw them below.

By passing a broad belt, V⁴, provided with pockets v², over the drums W W' and under the spout of a hopper, h², and providing a spout, S², at the dropping end of said carrier, as shown, the machine is changed into a potato or seed planter, in which case, however, the nippers do not do the setting, but only operate the carriers or apron through the escapement 2 3.

In Fig. 14 the hanger F, with its brace M, is shown on an enlarged scale. When the plow is out of the ground, the brace hangs vertically, as shown on dotted outline in Fig. 1. When the plow is to be let into the ground, the front end is released from the drum J, over which the rope I has been wound to draw it up, that part of the operation being performed by first passing it over the pulley K, as shown at I', to bring the point to the surface, after which the rope is thrown off the pulley K and the rope I wound until the plow and hangers assume the position shown in dotted outline in Fig. 1, where they are held. From this it will be observed that the brace M will hold up the rear end of the plow and cause its point to enter the ground quite abruptly, so that by the time the plow E has gone forward the length of the brace M the point has opened the furrow to the full depth, so as to admit the rear of the plow, the brace meanwhile falling over and letting it down. Lugs H' are attached to the inner sides of the rear end of the plow, through which bolts H, having an offset or shoulder, are passed, and against which the removable washer H⁴ rests, and between which and the head of the bolt the lug H' plays freely, the washer H⁴ resisting the strain of the nut.

When planting tender plants, it is desirable to release them before the nippers begin to draw upon them after the earth holds their roots, as is apt to be the case when the lower cam, N, alone opens the nippers. To accomplish this a rod, $g$, provided with cranks $g'$ $g^4$, is passed down to the lower nipper on the rear side of the planter-wheel. The upper end of the rod passes through the cam $f$, and has a spring, $g^x$, attached to it to throw the crank $g^4$ from the lever $a^3$. The crank $g'$ is connected by a link, $g^2$, to the bell-crank $g^3$. The lever $a'$ in its motion strikes the bell-crank, which, by its motion, throws the rod $g$, so that the crank $g^4$ will strike against the lever $a^3$, and thus instantly cause the plant to be released, the lever $g^3$ being held until it passes against the cam N, which will then hold the nippers open until the lever has passed it and the nippers below beyond the plant. The ends of the cams may be cut more or less abruptly, as shown at $c^2$, Fig. 7, so as to cause the nippers to seize or release more or less quickly.

The longitudinal adjustment of the plow is made by lengthening and shortening the draft-chain $r$, which adjustment is entirely independent of the vertical adjustment made in the hangers, and when, by considerable shortening of the chain $r$, the plow should be raised and make a shallower furrow, owing to the hangers swinging in an arc, it may be let down until the exact original depth of furrow is made.

The rollers $A^2$ have each a heavy beveled rim on their ends toward the planter-wheel, so made for the purpose of pressing the soil against the roots of the plants.

The depth at which the planter-wheel P works from the surface in the ground is regulated by raising or lowering the platform C and holding it at the desired elevation.

A rack, $q$, in the form of a hopper may be set over the carriers V, so constructed as to hold a large number of plants, $o$, which may be fed from it to the carriers.

The method of operating our plant-setting machine is substantially as follows, viz: The planter-wheel is first provided with the requisite number of nippers necessary for the setting of plants at the desired distance apart, it having first been arranged to turn with a known ratio of speed in regard to the motion of the machine, after which the gearing P' X is arranged to give the required speed to the carriers V, so as to supply each nipper with a plant as it passes through the brush. The plow E, shovel L, and planter-wheel are next gaged to the points they are to work to. Then, when the machine is drawn forward, motion will be given to all the parts, and thereby cause the plants to be fed to the nippers of the planter-wheel and carried down into the open furrow formed by the plow, and when at their proper position the earth of the furrow will close against their roots, thus holding the plants. The instant this is done the nippers, operated either by the cam N or crank $g^4$, will open and release the plant, and the roller $A^2$ following will compress the loose soil against their roots. Said rollers $A^2$ may also be used as a separate apparatus. The escapement 2 3 is so placed that the nippers, operated by the cam $c'$, will work it.

To adapt the motion of the spiders 1 1 to the motion of the various carriers V, pulleys Y and Z of different sizes must be substituted, or a set of cone-pulleys may be used.

In place of the friction-wheels P' and X bevel-gearing may be used, of which the wheel P' is provided with gears of all the required varying sizes, so as to give with a pinion, X, the required speeds to the carriers.

The plow E is made with two plane sides placed as closely together as the planter-wheel with its mechanism will admit of, and the front thereof is curved and straight across, so as to throw the ground up and out on each side of the furrow, the sides of the plow holding the walls of the furrow open until the plant is in its proper place, after which they cave in or are thrown against the plant.

The crank $i^x$ is made to work on any of the shafts provided with a stud, $i^2$, as the shafts $i^3$ $i^4$ $i^5$.

Clutches might conveniently be attached to the shaft driven by the wheel S and operated by the foot of the driver, so constructed as to raise the plow out of the ground and the platform C upward and hold them in such position, and to release them in a proper manner most conveniently; but the simple devices here shown answer to illustrate these essential points.

The escapement 2 3 may be dispensed with by simply using gearing which will give motion to the endless carrier to correspond accurately with that of the planter-wheel.

The cam N is the one that is placed between the sides of the plow, and must be so formed, shaped, and attached as not to hinder the motion of the neighboring parts. $c^2$ braces apart the sides of the plow.

Having thus sufficiently described our invention, what we claim is—

1. In combination with the adjustable plow E, the wheel P, provided with automatic nippers $a$, and carrier V, substantially as specified.

2. The carriers V $V^2$ $V^3$, in combination with wheel P, nippers $a$, plow E, and mechanism to operate said parts, substantially as specified.

3. The carriers V $V^2$ $V^3$ and spring-points $i^9$, in combination with wheel P, nippers $a$, plow E, and mechanism to operate said parts, substantially as specified.

4. The plow E, wheel P, provided with nippers $a$ and cams to operate said nippers, in combination with the cam $c'$, escapement 2 3, carrier V, and connecting mechanism, substantially as specified.

5. The plow E, wheel P, having automatic nippers $a$, in combination with cam $c'$, escapement 2 3, carrier V, hopper q, and connecting mechanism to operate said parts, substantially as specified.

6. An adjustable endless and revolving wheel or carrier, P, provided with automatically-operating nippers a, in combination with a longitudinally and vertically adjustable plow, said plow and carrier being adjustable to each other, substantially as specified.

7. In combination with revolving wheel or carrier P, having nippers a and adjustable and longitudinally swinging plow, the dragging-brace M, substantially as specified.

8. A planting-machine on wheels, provided with platform under which is hung an adjustable plow and rollers, in combination with an adjustable platform and wheel or carrier provided with automatically-operating nippers a, and means for closing the furrow, substantially as specified.

9. In combination with the adjustable carrier V and adjustable brush d, the spiders 1 1, springs i, wheel P, with automatic nippers a, and mechanism to operate said parts, substantially as specified.

10. In a planting-machine, plows to open and close the furrow, and an endless carrier, V, in combination with a revolving wheel or carrier, P, having automatically-operating nippers a, and connecting mechanism to operate said carriers, substantially as specified.

11. In a planting-machine, a plow and wheel or carrier provided with automatically-operating nippers a, in combination with carrier V, brush d, and spring i, substantially as specified.

12. In combination with wheel or carrier P, provided with automatically-operating nippers a, the spiders 1 1, and brush d, substantially as specified.

13. The wheel P, provided with nippers a, in combination with the springs i and brush d, substantially as specified.

14. The wheel P, provided with nippers a, in combination with the brush d, springs i, and cams c and N, substantially as specified.

15. In combination with the wheel provided with the nippers a, the cam f, shaft g, having cranks $g'$ $g^4$, spring $g^x$, and parts $g^2$ $g^3$, substantially as specified.

16. In combination with the wheel provided with nippers a, the cams f and N, shaft g, having cranks $g'$ $g^4$, spring $g^x$, and parts $g^2$ $g^3$, substantially as specified.

17. In combination with the wheel provided with nippers a, the adjustable plow provided with lugs H', swinging slotted hangers, shouldered bolt H, and washer $H^4$, substantially as specified.

18. In combination with the wheel P and nippers a, the plow E, hanger F, and brace M, substantially as specified.

19. In combination with the carriers V and planting mechanism P, the carriers $V^2$ $V^3$, substantially as specified.

20. In combination with wheel P and nippers a, the carriers V, spiders 1 1, and connecting mechanism to operate said parts, substantially as specified.

21. In combination with the plow E and wheel P, provided with automatic nippers a, the pulleys U, T, S, S', and R, to operate said wheel, and connecting mechanism to operate said parts, substantially as specified.

22. In combination with the plow E and wheel provided with nippers a, the wheel P, adjustable pinion X, and carrier V, substantially as specified.

23. The plow E, in combination with wheel P, provided with nippers a, cams to operate said nippers, wheel A, pulleys and belts, and connecting mechanism to operate said wheel P, substantially as specified.

24. The wheel P, provided with nippers a, in combination with cams to operate said nippers, carriers V, spiders 1 1, pulleys Y Z P', and escapement 2 3, substantially as specified.

25. The adjustable gearing P X, carrier V, spiders 1 1, wheel P, with automatic nippers a, in combination with plows E L, adjustable longitudinally and vertically, and connecting mechanism to operate said parts, substantially as specified.

26. The platform B, with wheels A, plows, and rollers, in combination with the adjustable platform provided with revolving mechanism having automatically-operating nippers a, said revolving mechanism being revolved by wheels A, provided with pulleys and belts and intermediate mechanism, substantially as specified.

27. A planting-machine provided with a fixed frame or platform, under which is hung a plow adjustable longitudinally and vertically, and upon which is hinged an adjustable platform carrying a planter-wheel provided with mechanism to receive the plants from a feeding device and carry and place them into the furrow at gaged depths and there hold, plant, and release them from the mechanism, substantially as specified.

28. A plant-setting machine having revolving wheel or carrier provided with nippers a, operated by cams which receive their motion from one of the carrying-wheels A, and the forward motion of the machine, whereby a plant may be held over a fixed point, planted, and released from the machine by mechanism substantially as specified.

29. A plant-setting machine provided with revolving carrier having automatically-operating nippers a, in combination with carrier V and adjustable connecting mechanism, substantially as specified.

30. In combination with a plow and wheel P, provided with nippers a, the guide or gage p, substantially as specified.

WILLIAM ZIMMERMAN.
FRED G. ZIMMERMAN.

Witnesses:
C. W. BOOTH,
CHARLES D. ZIMMERMAN.